(12) United States Patent
Bechtold

(10) Patent No.: US 10,865,912 B2
(45) Date of Patent: Dec. 15, 2020

(54) SNAP-ON TUBE AND PIPE SUPPORT CLAMP

(71) Applicant: The Sloan Brothers Co., Freeport, PA (US)

(72) Inventor: Michael Bechtold, Pittsburgh, PA (US)

(73) Assignee: The Sloan Brothers Co., Freeport, PA (US)

( * ) Notice: Subject to any disclaimer, the term of this patent is extended or adjusted under 35 U.S.C. 154(b) by 0 days.

(21) Appl. No.: 16/391,662

(22) Filed: Apr. 23, 2019

(65) Prior Publication Data

US 2019/0323632 A1    Oct. 24, 2019

Related U.S. Application Data

(60) Provisional application No. 62/661,394, filed on Apr. 23, 2018.

(51) Int. Cl.
*F16L 3/223* (2006.01)
*F16L 3/10* (2006.01)

(52) U.S. Cl.
CPC ........... *F16L 3/2235* (2013.01); *F16L 3/1091* (2013.01)

(58) Field of Classification Search
CPC ............ F16L 3/2235; F16L 3/222; F16L 3/22
See application file for complete search history.

(56) References Cited

U.S. PATENT DOCUMENTS

| | | | |
|---|---|---|---|
| 3,286,767 A | 11/1966 | Evans | |
| 3,367,683 A * | 2/1968 | Mattson | F16L 33/23 285/243 |
| 4,128,918 A | 12/1978 | Wenk | |
| 4,557,024 A | 12/1985 | Roberts et al. | |
| 4,955,574 A | 9/1990 | Freier | |
| 5,029,782 A * | 7/1991 | Andre | F16L 3/2235 248/68.1 |
| 5,083,372 A | 1/1992 | Polutnik et al. | |
| 5,136,985 A | 8/1992 | Krowech | |
| 5,992,802 A * | 11/1999 | Campbell | H02G 3/30 248/68.1 |
| 6,007,029 A | 12/1999 | Barriger et al. | |
| 6,536,982 B2 * | 3/2003 | Gibbons | F16B 7/0433 403/391 |
| 6,561,466 B1 * | 5/2003 | Myers | F16L 3/221 248/68.1 |
| 6,783,101 B2 | 8/2004 | Knotts | |

(Continued)

FOREIGN PATENT DOCUMENTS

WO    2010133338 A1    11/2010

OTHER PUBLICATIONS

Knotts & Company, "Installation instructions for Knolls 'Universal Split Ring Clamp'", Downloaded on Mar. 28, 2018, p. 1-2.

(Continued)

*Primary Examiner* — Bradley Duckworth

(74) *Attorney, Agent, or Firm* — The Webb Law Firm

(57) ABSTRACT

A tube clamp device for supporting tubing has two halves. Each half has a channel designed to engage a tube. One half has a tooth, or male joint, that corresponds to a gap, or female joint, of the other half, such that each half engages both the tube and the other half to secure the tube without requiring a fastener.

10 Claims, 5 Drawing Sheets

(56) References Cited

U.S. PATENT DOCUMENTS

| | | | | |
|---|---|---|---|---|
| 8,342,474 B2* | 1/2013 | Gilbreath | ................ | F16L 3/222 |
| | | | | 165/162 |
| 8,702,044 B2* | 4/2014 | Railsback | ............. | F16L 3/2235 |
| | | | | 248/229.22 |
| 9,038,968 B2* | 5/2015 | Hennon | ................ | F16L 3/1091 |
| | | | | 248/65 |
| 9,400,066 B2* | 7/2016 | Barre | ..................... | F16L 3/1091 |
| 2009/0265894 A1 | 10/2009 | Link et al. | | |
| 2010/0117360 A1* | 5/2010 | Chan | .................... | F16L 21/005 |
| | | | | 285/373 |
| 2017/0043153 A1 | 2/2017 | Ramos et al. | | |
| 2018/0058611 A1* | 3/2018 | Rillie, Jr. | .............. | F16L 3/2235 |
| 2018/0320800 A1* | 11/2018 | Pieske | ................... | F16L 3/1207 |
| 2019/0039747 A1* | 2/2019 | Gilbertson | ............ | F16L 3/2235 |
| 2019/0260144 A1* | 8/2019 | Pfeiffer-Wagner | ...... | H01R 4/48 |

OTHER PUBLICATIONS

Swagelok, "Stainless Steel Seamless Tubing and Tube Support Systems", Oct. 2017, p. 1-11.

* cited by examiner

SNAP-ON TUBE AND PIPE SUPPORT CLAMP

CROSS REFERENCE TO RELATED APPLICATION

The present application claims priority to U.S. Provisional Patent Application No. 62/661,394, filed on Apr. 23, 2018, which is incorporated herein by reference in its entirety.

BACKGROUND OF THE INVENTION

Field of the Invention

This invention relates in general to a device for supporting a tube or plurality of tubes. Such tubes include instrumentation tubing and piping, pneumatic tubing and piping, hydraulic tubing and piping, electrical conduit, electrical cabling, or other rigid tubing or cabling.

Description of Related Art

Tubing often requires a supporting device to dampen vibration and keep individual tubes separated from each other. Prior tube support devices do not support multiple tubes, can move axially along the length of a tube, and/or do not support a tube around the full circumference not the tube.

BRIEF SUMMARY OF THE INVENTION

This invention provides a tube clamp device to support tubing, piping, conduit, or cabling. This device allows multiple tubes to be captured and supported around the circumference of each tube and keeps each tube isolated from one another. The tube clamp securely captures each tube to prevent each tube from being pulled out of the tube clamp. The tube clamp includes two halves, each with a channel for each tube to be supported. The channel is designed to allow each half to be independently secured to a tube. The first half and second half also have matching male and female joints to allow engagement of the first half with the second half. When the first half and second half are engaged together, the channel of the first half and the channel of the second half together form an aperture supporting the tube around its circumference. When the first half and second half are engaged on a tube, each half captures the tube and the other half, securing the tube and preventing the tube clamp from sliding axially along the length of the tube.

DETAILED DESCRIPTION

EXAMPLES

The following is a list of explanatory non-limiting examples. There is no intention to deviate from the plain and ordinary meaning of the terms below and the following list contains illustrative examples only that are intended to be consistent with the plain and ordinary meaning of the terms.

Non-limiting examples of tubes for use with the disclosed tube clamps include instrumentation tubing and piping, pneumatic tubing and piping, hydraulic tubing and piping, electrical conduit, electrical cabling, or other rigid tubing or cabling. The tube clamps have particular utility for use with small diameter (less than 2") tubing installations commonly used in industrial and commercial applications. For example, the tube clamps may be used with tubes having a diameter of ⅛", ¼", ½", ¾", 1", 1⅛", 1¼", 1½", 1¾", or 2".

DESCRIPTION

Figure 1:
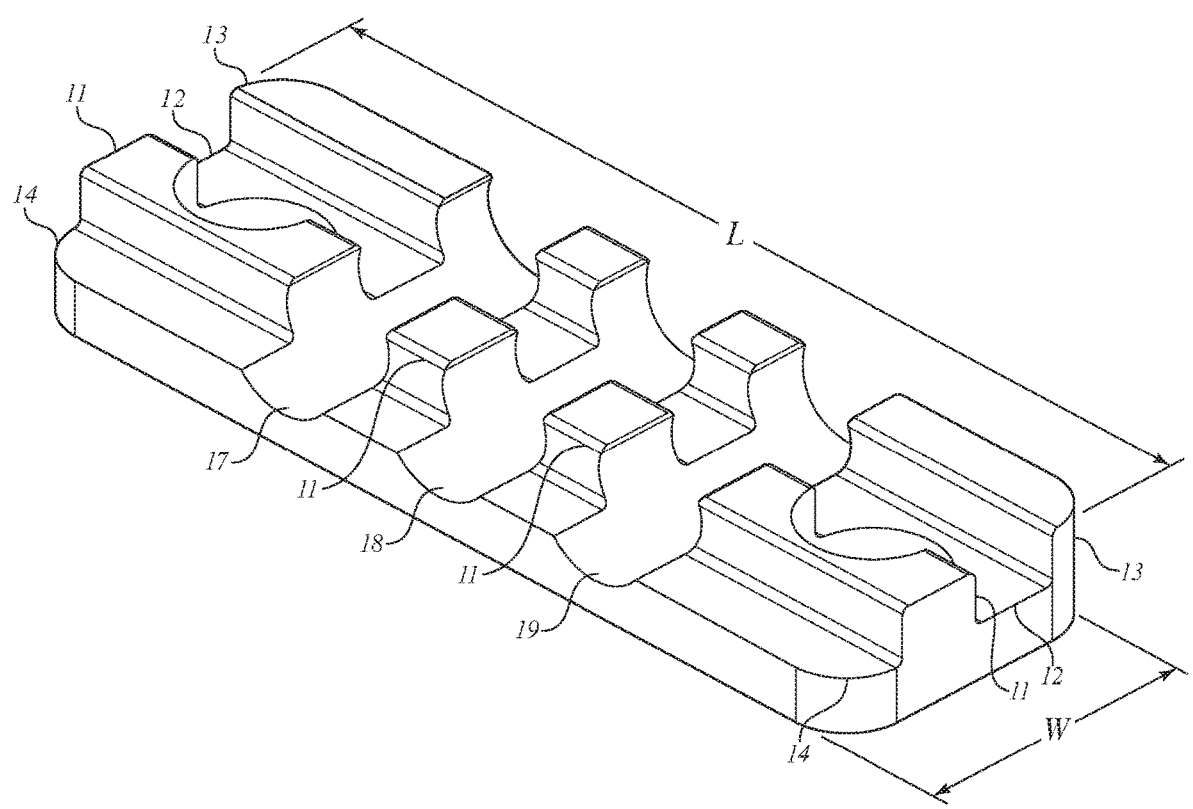
FIG. 1 shows an isometric view of one half of a tube clamp.
Figure 2:
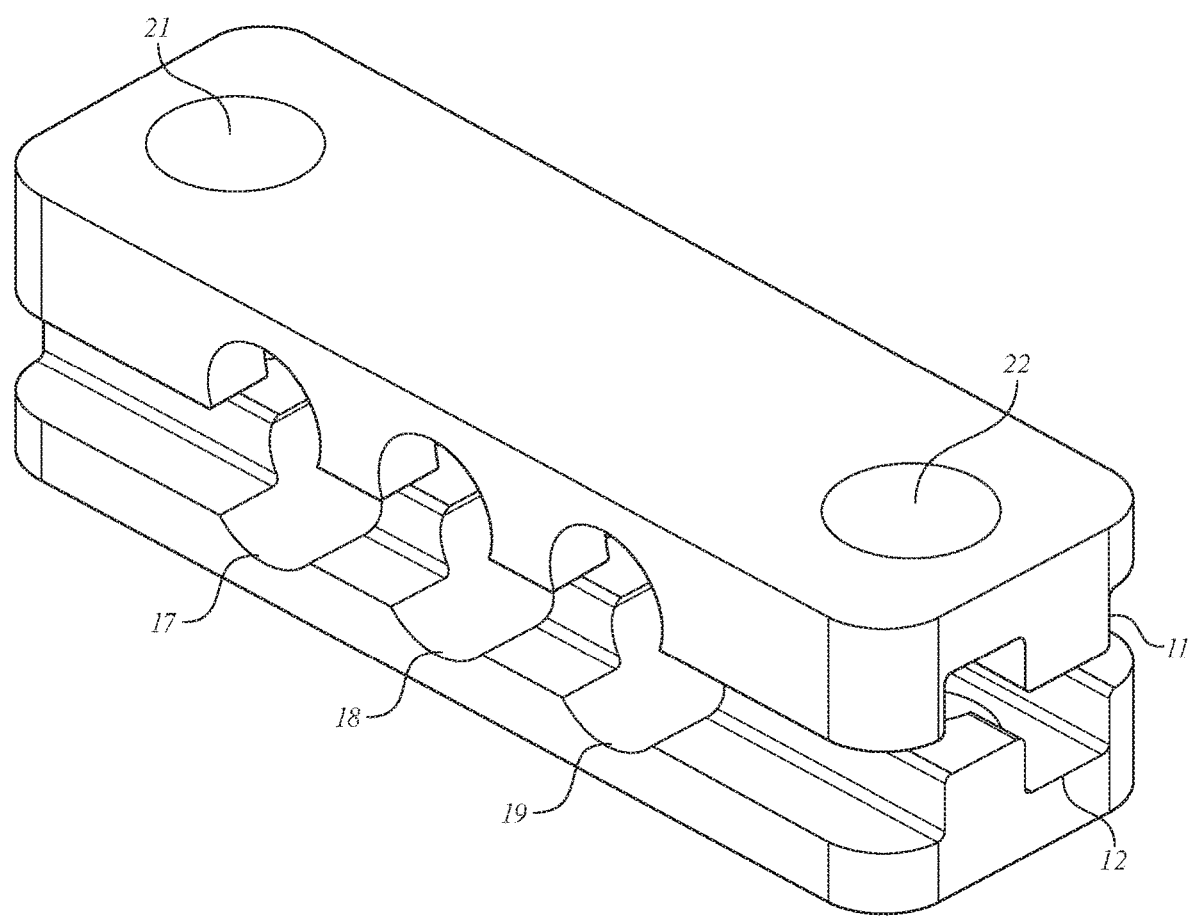
FIG. 2 shows an isometric view of two halves of a tube clamp disassembled.
Figure 4:
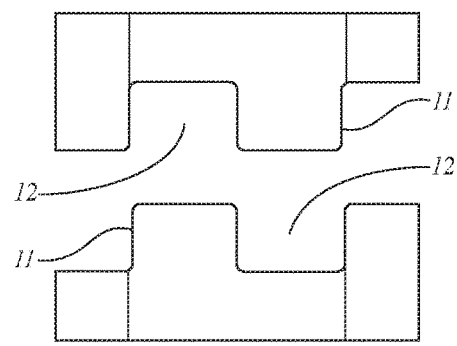
FIG. 4 shows a side view of two halves of a tube clamp disassembled.
Figure 6:
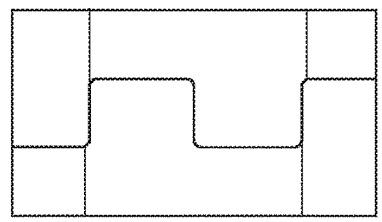
FIG. 6 shows a side view of two halves of a tube clamp assembled.

FIG. 1 shows an embodiment of one half of a tube clamp. The tube clamp half has a length dimension "L" and a width dimension "W." Along the length of the tube clamp half is a tooth 11 and a gap 12 parallel to the tooth 11. The gap 12 is formed between the tooth 11 and an end tooth 13. On the side of the tooth 11 opposite from the gap 12 is an end gap 14. The tooth 11 and gap 12 have the same width, and the height of the tooth 11 is the same as the depth of the gap 12. The end tooth 13 and the end gap 14 similarly have the same width, and the height of the end tooth 13 is the same as the depth of the end gap 14. The tube clamp half is configured so that one tube half clamp may be engaged with another, identical tube clamp half rotated 180-degrees. The tooth 11 and gap 12 serve as corresponding male and female joints, respectively, that are used to engage two identical tube clamp halves together, as shown in FIGS. 2, 4, and 6. The tooth 11 of each tube clamp half fits into the gap 12 of the other half, and the end tooth 13 of each tube clamp half fits into the end gap 14 of the other half.

In other embodiments, the two halves are not identical, with one half having a single tooth as a male joint and the other half having a corresponding single gap as a female joint for engagement of the two halves. Various other configurations are possible for permitting engagement of the two halves of the tube clamp.

Figure 5:
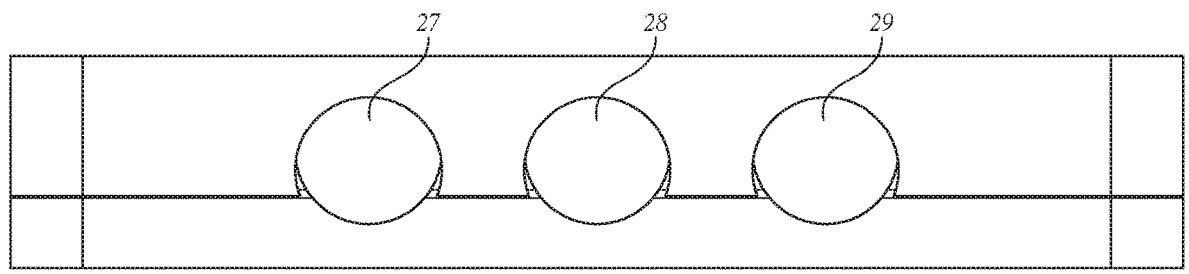
FIG. 5 shows a front view of two halves of a tube clamp assembled.
Figure 7:
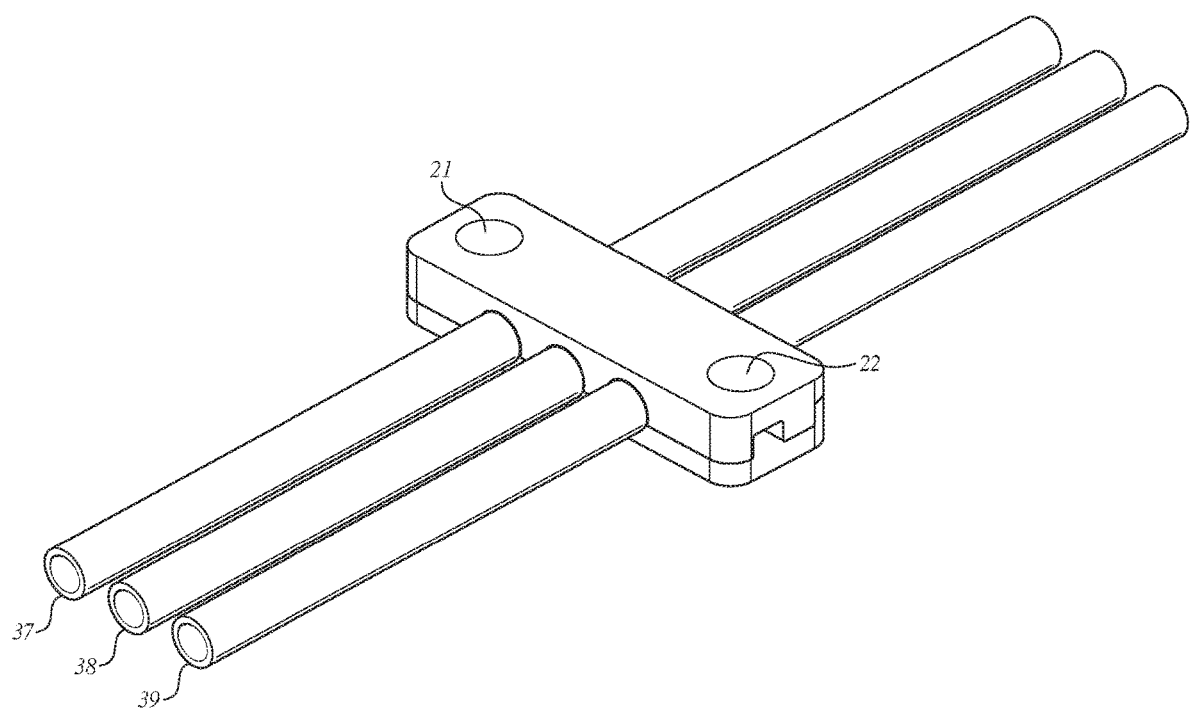
FIG. 7 shows an isometric view of two halves of a tube clamp assembled and secured to tubing.

Channels 17, 18, 19 are cut through the tube clamp half across the width of the tube clamp half. The channels 17, 18, 19 are cut through and are perpendicular to the tooth 11 and gap 12. When the male joint of one half is engaged with the female joint of a second half to form an assembled tube clamp, the channels of the first half together with the channels of the second half form apertures 27, 28, 29, as shown in FIG. 5. The apertures are used to capture and secure tubes 37, 38, 39, as shown in FIG. 7. Each aperture preferably supports a tube around the tube's entire circumference.

The number and size of channels may be varied depending on the size and number of tubes to be supported. For example, the tube clamp half may have 1, 2, 3, 4, 5, or 6 channels to support 1, 2, 3, 4, 5, or 6 tubes, respectively. The size and shape of each channel is designed to correspond to the size and shape of the tube to be supported. For example, for a 1" round tube, the channel has a circular profile, such that the channel of a first tube clamp half and the channel of a second tube clamp half together form a 1" diameter circular aperture supporting the entire circumference of the round tube. The channels may be various shapes and sizes, and may have predetermined shapes and sizes designed for the surface defining the aperture formed by the tube clamp to be in contact with the entire outer surface of the tube.

Figure 3:
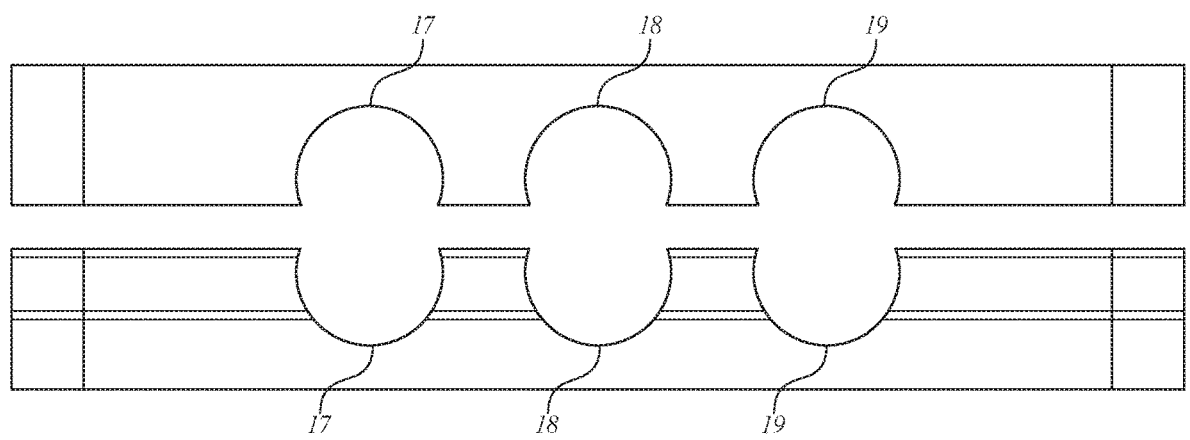
FIG. 3 shows a front view of two halves of a tube clamp disassembled.

In some embodiments, the tube clamp halves are made of a flexible material such as nylon, and the channel shape is between a semi-circle and a full circle, as shown in FIGS. 1, 2, and 3. Using a somewhat flexible material and a channel shape between a semi-circle and a circle permits a tube clamp half to be secured on a tube by pushing the channel onto the tube so that the channel snaps onto the tube without sliding along the length of the tube. This permits easy installation of a tube clamp by securing one tube clamp half onto the tubes to be supported, then securing a second tube clamp half on the tubes while also engaging the corresponding male and female joints of two halves to form an assembled tube clamp as shown in FIG. 7. Because each tube clamp half is secured in place on the tubes and engaged with each other using corresponding male and female joints, no fastener between the two halves is required.

The disclosed tube clamp may be made of any solid material, such as plastic, metal, wood, or ceramic. The material preferably is flexible enough to permit securing the tube clamp to a tube by pushing the channel over a tube, but also rigid enough to support the tubes. The material also preferably will not cause wearing or cutting into the tubes.

As shown in FIG. 2, each tube clamp half has optional bolt holes 21, 22. A bolt or other fastener may be installed through the bolt holes 21, 22 to secure an assembled tube clamp to another object, such as a wall or equipment frame.

I claim:

1. A tube clamp comprising:
a first half and a second half,
said first half comprising a plurality of first channels and two male joints,
said second half comprising a plurality of second channels and two female joints corresponding to said male joints,
wherein when said male joints are engaged with said female joints, said plurality of first channels and said plurality of second channels form a plurality of apertures, and
wherein said plurality of first channels have a predetermined shape greater than a semi-circle and less than a full circle designed for the surface defining each first channel of the plurality of first channels to be in contact with an outer surface of a tube of a plurality of tubes, wherein when at least one of said first channels is engaged with at least one of said tubes, said contact prevents said first half from sliding axially along said tube;
wherein the predetermined shape of each of the first channels is symmetrical across a vertical plane that bisects each of the first channels at a minimum height of the first channels;
wherein the plurality of first channels define through each male joint such that each male joint comprises two parallel edges that define the shape of each first channel of said plurality of first channels; and
wherein the first half is secured to each tube of the plurality of tubes by the two parallel edges of each male joint.

2. The tube clamp of claim 1, wherein said first half and said second half are identical.

3. The tube clamp of claim 1, wherein said plurality of first channels and said plurality of second channels are predetermined shapes designed for the surface defining said plurality of apertures to be in contact with the entire outer surface of said plurality of tubes.

4. The tube clamp of claim 1, wherein said first half may be secured to said tube by pushing at least one of said first channels over at least one of said tubes.

5. The tube clamp of claim 1, wherein said tube clamp is made of nylon.

6. The tube clamp of claim 1, further comprising two bolt holes configured to secure the tube clamp to another object using a bolt or other fastener.

7. A tube clamp half comprising:
a length and a width,
a tooth and an end tooth along said length,
a gap and an end gap along said length, wherein said tooth and said gap have the same width, and the height of said tooth is the same as the depth of said gap and wherein said end tooth and said end gap have the same width, and the height of said end tooth is the same as the depth of said end gap, and
a plurality of first channels across said width and through said tooth, said end tooth, and said gap, and said end gap such that the tooth and end tooth each have two parallel edges that define a shape greater than a semi-circle and less than a full-circle for each first channel of the plurality of first channels, said plurality of first channels designed for the surface defining each first channel of said plurality of first channels to be in contact with an outer surface of a tube of a plurality of tubes, wherein when at least one of said first channels is engaged with at least one of said tubes, said contact prevents said tube clamp half from sliding axially along said tube, and
wherein the shape of each of the first channels is symmetrical across a vertical plane that bisects each of the first channels at a minimum height of the first channels;
wherein said tube clamp half is secured to each tube of the plurality of tubes by the two parallel edges of both the tooth and end tooth, and
wherein said plurality of first channels is configured to engage with a plurality of second channels of a second tube clamp half to form a plurality of apertures.

8. The tube clamp half of claim 7, wherein said tube clamp half may be secured to at least one of said tubes by pushing at least one of said first channels over at least one of said tubes.

9. The tube clamp half of claim 7, wherein said tube clamp half is made of nylon.

10. A tube clamp comprising:
a first half and a second half,
said first half comprising a first channel and two male joints,
said second half comprising a second channel and two female joints corresponding to said male joints,
wherein when said male joint is engaged with said female joint, said first channel and said second channel form an aperture, and
wherein said first channel has a shape greater than a semi-circle and less than a full circle for the surface defining said first channel to be in contact with an outer surface of a tube, wherein said first channel defines through said male joints such that each male joint comprises two parallel edges that define the shape of said first channel,
wherein the shape of the first channel is symmetrical across a vertical plane that bisects each of the first channels at a minimum height of the first channels,
wherein the first half is secured to the tube by the two parallel edges of each male joint, and
wherein when said first channel is engaged with said tube, said contact prevents said first half from sliding axially along said tube.

\* \* \* \* \*